Sept. 11, 1962 — M. QUENOT — 3,053,470
MEASURING-TAPE
Filed Jan. 23, 1961 — 3 Sheets-Sheet 1
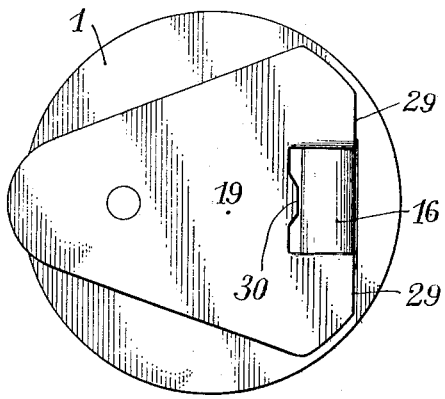
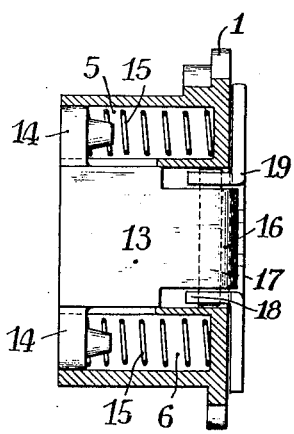
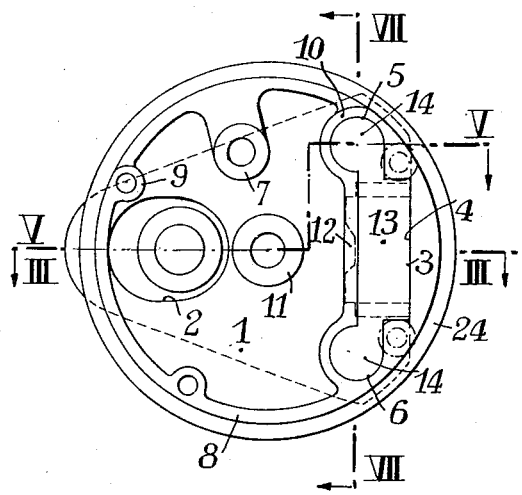
INVENTOR
Michel Quenot

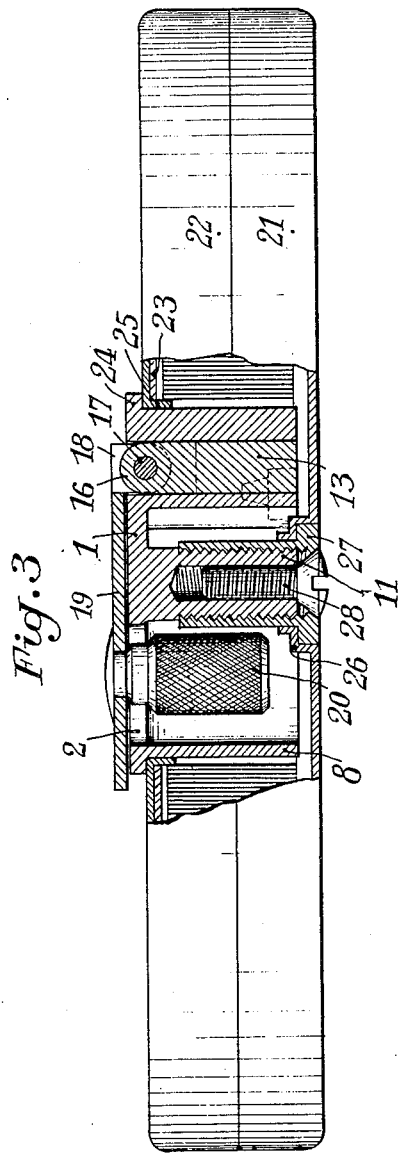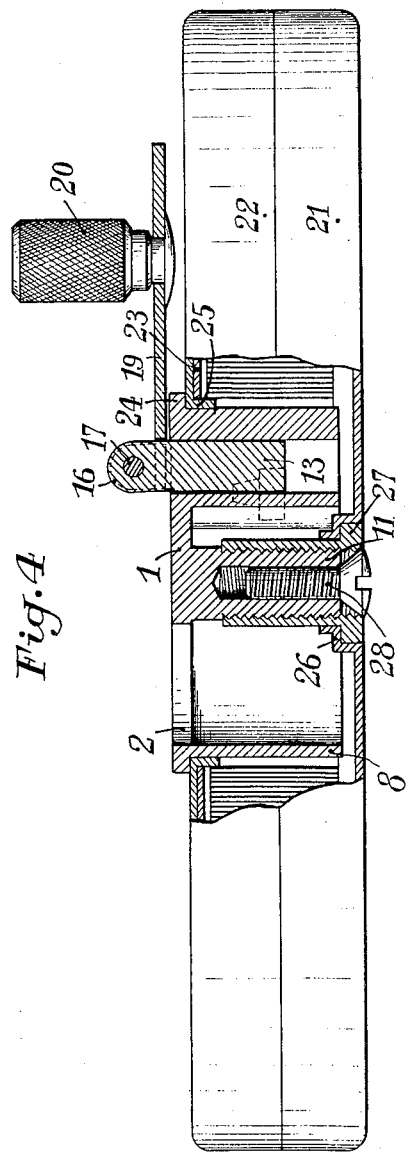

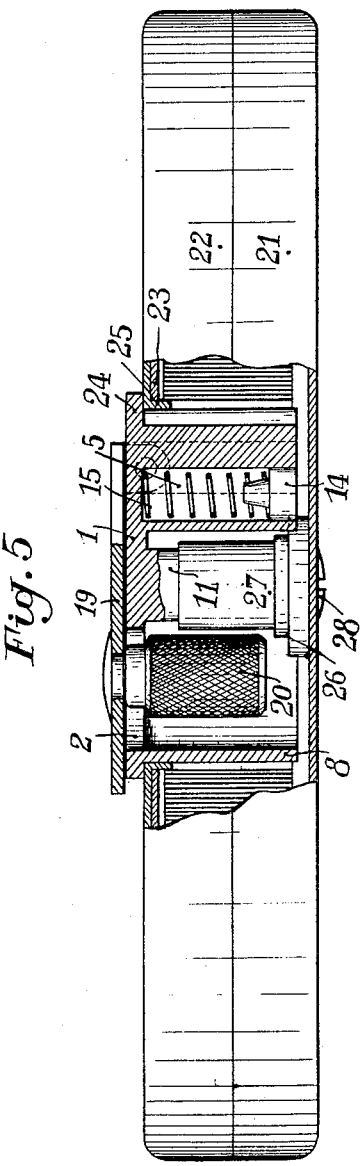
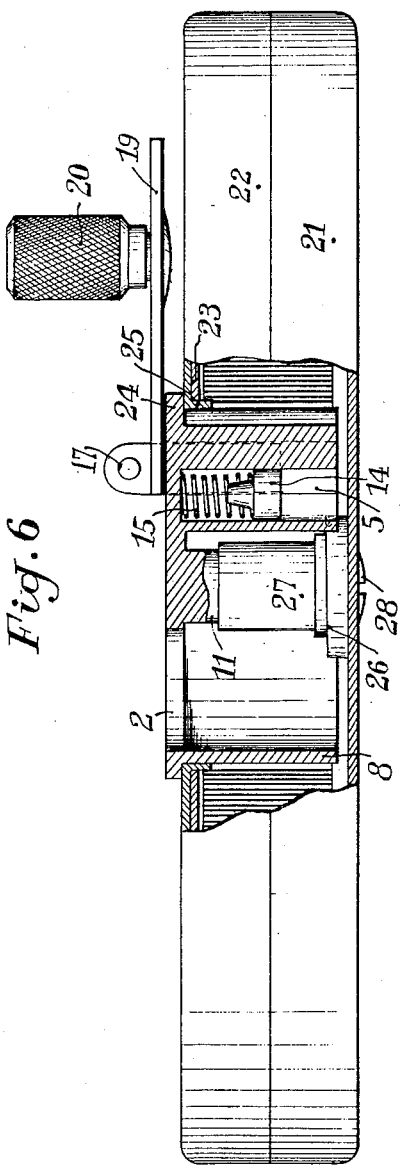

3,053,470
MEASURING-TAPE
Michel Quenot, 48 Ave. George Clemenceau,
Besancon (Doubs), France
Filed Jan. 23, 1961, Ser. No. 84,274
5 Claims. (Cl. 242—84.8)

In any measuring-tapes the crank handle is retractable or collapsible as the crank arm has its inner end hingedly mounted so that the crank handle may occupy two positions, that is, an operative position with the handle projecting from the casing, and an inoperative position with the crank handle retracted within the casing; however, in hitherto known devices the hinge pin about which the crank arm is mounted has a fixed position above the casing so that the projection formed thereby is unpleasant and troublesome for example when the measuring-tape is put into one's pocket.

It is the object of the present invention to provide a measuring-tape with collapsible crank handle wherein the crank hinge is also collapsible.

To this end, and according to a specific form of embodiment of this invention, this hinge is offset with respect to the plane of the crank arm and so mounted as to lie outside the casing of the measuring-tape when the crank handle is in its operative position, and inside the casing when the crank handle is in its inoperative position; this hinge may be located on the end of a member slidably mounted within the casing in front of a window formed to this end in said casing, and be constantly urged by a spring toward the inside of the casing; if desired, this spring may be adapted to have two positions of stable equilibrium, one in which it resiliently urges the crank handle to its operative position, and another in which it resiliently urges the crank handle to its inoperative or retracted position; according to a preferred embodiment of this invention, the hinge is mounted on the upper portion of a member slidably mounted in the casing and movable in a direction at right angles to the plane of this casing.

In order to afford a clearer understanding of this invention and of the manner in which the same may be carried out in practice, reference will now be made to the accompanying drawings illustrating diagrammatically by way of example a typical form of embodiment of the improved measuring-tape of this invention. In the drawings:

FIGURE 1 is a plan view showing the winding mechanism removed from the casing.

FIGURE 2 is a view taken from beneath also showing the winding mechanism removed from the casing.

FIGURES 3 and 4 are partial cross-sectional views taken upon the line III—III of FIG. 2, the crank handle being shown in its inoperative position and in its operative position, respectively;

FIGURES 5 and 6 are cross-sectional views taken upon the line V—V of FIG. 2, the crank handle being shown in its inoperative position and in its operative position, respectively; and FIGURE 7 is a cross-sectional view taken upon the line VII—VII of FIG. 2.

The mechanism illustrated in the drawings comprises a plate or flange 1 having formed therein on the one hand an elongated aperture 2 adapted to receive, as will be explained presently, the crank handle, and on the other hand a rectangular aperture 4 from which the hinge of a crank arm is adapted to emerge as will also be explained presently.

On its inner face the plate 1 has formed a stud or like projection 7 on which the inner end of the measuring-tape proper is adapted to be attached; also projecting from the inner face of plate 1 is a part-cylindrical wall portion 8 forming a rotary drum and having at its ends a pair of tubular studs 9, 10, a central socket 11 formed with a threaded outer surface and a tapered blind bore, and a block 12 formed in turn with a rectangular cavity 3 connected to a pair of end circular recesses 5, 6 the rectangular cavity 3 communicating with and constituting the extension of the rectangular aperture 4, the bottoms of the circular recesses 5, 6 being closed.

Slidably fitted in these cavities is a member 13 of which the central portion of substantially rectangular configuration corresponds in shape to the rectangular cavity 3, and a pair of circular studs 14 rigidly connected to this central portion and guided in the aforesaid circular recesses 5, 6 as shown.

Coil springs 15 may be disposed above these studs so as to react against the bottom of said recesses 5, 6.

The upper portion of member 13 is rounded as shown at 16 and comprises a central pin 17 having pivotally mounted at its ends the lugs or ears 18 of the crank arm 19 consisting of a relatively thin plate carrying the crank handle or knob proper 20 in the vicinity of its outer end.

This mechanism is mounted inside a casing structure comprising the casing proper 21 and its cover 22; the casing itself may also constitute the cover of an inner case 23 mounted inside the cover 22.

The shoulder 24 of plate 1 which surrounds the part-cylindrical partition or wall 8 thereof bears on a cylindrical in-turned lip 25 provided to this end in the central opening of the casing cover 22; the casing proper comprises a central bore in the bottom of a flat-bottomed cup 26; a tapped screw 27 may be screwed on the central threaded socket 11 of the mechanism in order to hold the mechanism within the casing 21, 22; a counter-screw 28 having its threads opposite to those of screw 27 may be used to lock the assembly against the accidental unscrewing or loosening.

The measuring-tape proper having one loop-shaped end threaded on the stud 7 is wound about the mechanism in the casings 21, 22, 23; its opposite end can be pulled out from the casing through an aperture (not shown).

As will be clearly seen from the drawings, the hinge 18 of the crank arm 19 supporting the crank handle 20 lies within the aperture 4 and the crank handle or knob 20 is housed in the elongated aperture 2 when the handle is in its inoperative position; when it is desired to utilize the tape, the outer end of the crank arm 19 is lifted and as its opposite end engages with its edges 29 the outer surface of plate 1, this arm 19 can pivot by acting as a lever arm and carry along the member 13 with its stud 14 while compressing the springs 15; thus, the hinge pin 17 emerges from the casing and the crank arm can continue its angular movement until it occupies its operative position shown in FIGS. 4 and 5, the hinge 18 then projecting completely from the outer surface of plate 1; this movement of rotation is limited by the engagement occurring between the nose 30 of arm 19 and the casing; this form of assembly is particularly advantageous for the springs 15 will resiliently urge the crank handle to its two end positions, that is, both its inoperative position (in which the crank handle 20 is located inside the mechanism) and its operative position.

Of course, it will be readily understood that the form of embodiment of the invention which is described and illustrated herein should not be construed as limiting the present invention since it merely constitutes a typical example to which many modifications and variations may be brought without departing from the spirit and scope of the invention as set forth in the appended claims, the invention consisting broadly of any device wherein a hinge is retractable to an inoperative position so as to exhibit only a nearly flat surface in this position; thus, the term "measuring-tape" should not be taken in its strict meaning for it designates as a rule any device for measuring lengths, irrespective of the tape length, wherein the collapsible crank-handle device described hereinabove and illustrated in the accompanying drawings can be used.

What I claim is:

1. In a crank-handle measuring tape comprising a casing, a rotary drum in said casing, a crank handle for controlling the rotation of said drum, the handle portion of said crank handle being adapted to be retracted within said casing in the inoperative position, and a member slidably mounted in said drum at right angles to the bottom of said casing, the crank arm being pivotally mounted on the end of said member, the hinge axis between said arm and said sliding member being off-set so that said hinge lies outside said casing and above the plane of said arm when said crank handle is in its operative position, and retracted within said casing and beneath the plane of said arm when said crank handle is in its inoperative position, and at least one spring located in the casing and in contact with the sliding member constantly urging said sliding member toward the bottom of said casing for resiliently maintaining said crank handle in its position, whether operative or inoperative.

2. In a measuring tape as set forth in claim 1, a crank arm consisting of a relatively thin plate provided, at its end opposite to that carrying the handle proper, opposite the hinge, with edges bearing on said casing during the initial portion of the movement for moving the crank handle to its operative position so that it can act as a lever arm for compressing the spring acting upon said sliding member until said sliding member attains its end position during said opening movement.

3. In a measuring tape as set forth in claim 1, a crank arm consisting of a relatively thin plate formed in the vicinity of its hinge and on the same side of this hinge as said handle, a nose-like projection engaging the edge of said casing at the end of the opening movement of said crank handle to limit the rotation thereof.

4. In a measuring tape as set forth in claim 1, a member of elongated configuration slidably mounted in said drum, which terminates on either side with a stud, and a pair of springs bearing respectively under the upper face of said casing and on the base of said studs, respectively.

5. In a measuring tape as set forth in claim 1, a crank arm consisting of a relatively thin plate provided with a pair of ears bent at right angles, a hole formed in each ear so that the two holes register with each other, and a hinge consisting of a pin carried by the upper end of said sliding member and engaged in the hole of each ear.

References Cited in the file of this patent

UNITED STATES PATENTS

| | | |
|---|---|---|
| 1,024,139 | Miller | Apr. 23, 1912 |
| 1,056,849 | Starrett | Mar. 25, 1913 |
| 1,110,994 | Roe | Sept. 15, 1914 |
| 2,899,839 | Zelnick | Aug. 18, 1959 |